United States Patent Office 3,432,808
Patented Mar. 11, 1969

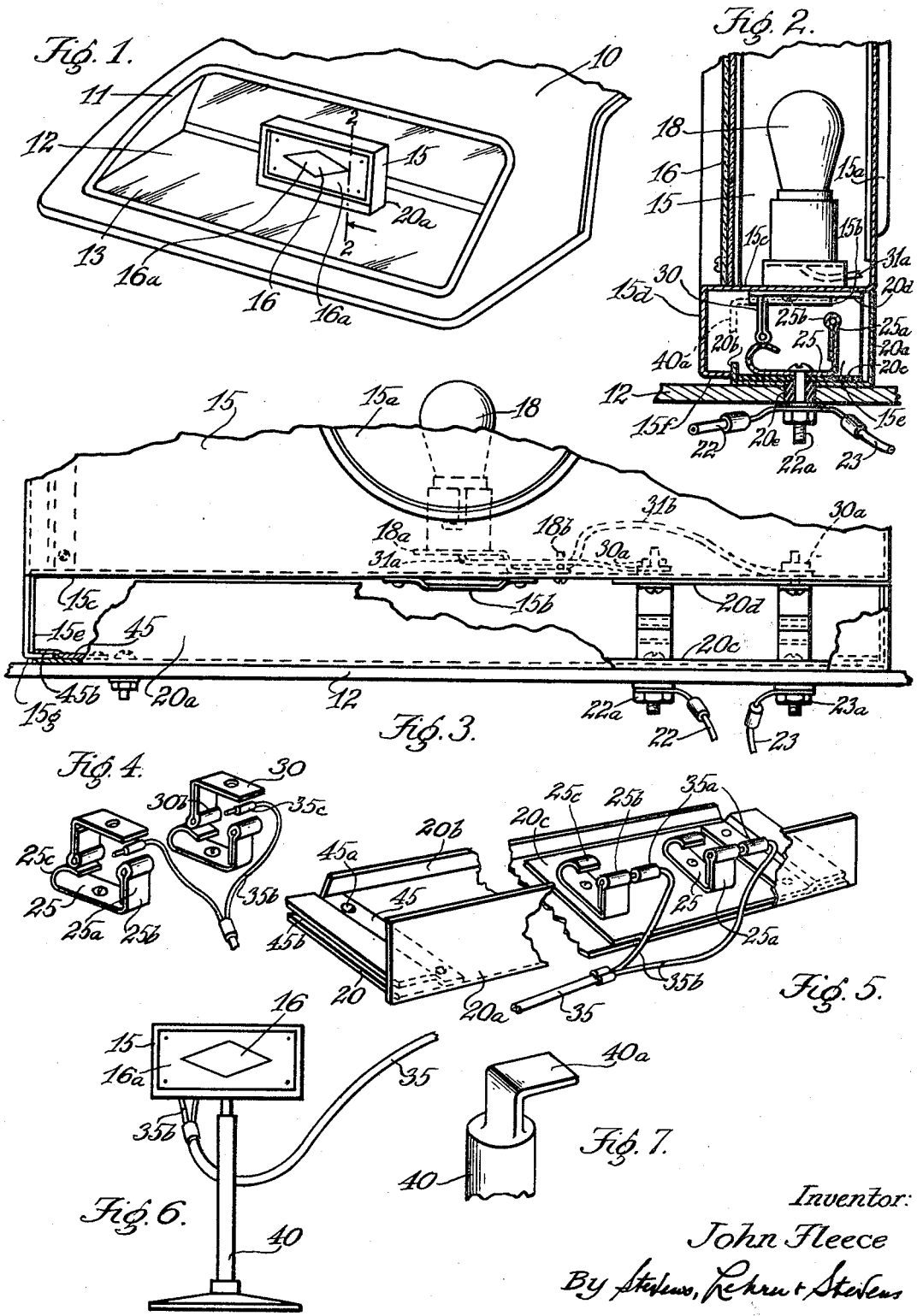

3,432,808
CAUTION LIGHTS FOR MOTOR CARS
John Fleece, 14600 Union St., Harvey, Ill. 60426
Filed Mar. 13, 1967, Ser. No. 622,567
U.S. Cl. 340—84                    10 Claims
Int. Cl. B60q *1/26, 1/44;* G08b *23/00*

ABSTRACT OF THE DISCLOSURE

This invention comprises a removable caution light which is normally mounted inside the rear window of a motor vehicle. The caution light consists of a stationary base permanently connected to the electrical wiring system of the vehicle, and a signal housing removable from the base and adapted to receive a current supply cord, whereby the housing can be removed from the base to be placed on top, or at some distance behind the vehicle, to communicate with other motorists.

---

This invention relates to signals carried by motor cars for indicating to motorists behind or approaching from the front that the car emitting the signal is about to slow down or pull off the road. Motorists often employ the flashing turn-signal to indicate such an intention; and on the highway laws in most localities require that a flashing signal be set 15 feet behind the car in order to allow room for cars behind to pass the parked car in the clear. Usually, a motor car in an emergency—or desiring to make a stop—pulls over on the shoulder of the highway; and a warning light may therefore be set on the edge of the highway in order to be readily visible from behind.

The main object of the present invention is to provide a comprehensive signal or caution light which is more attractive and understandable in scope and intent, and more conspicuous and readily usable either in the car, on top of the same, or on the road behind the car.

A further object is to provide a caution light which is normally mounted inside the rear window of the motor car, yet easily removable for mounting on top of the car or on a stand some distance behind as a warning to motorists following from the rear.

Another object is to provide a caution light with a stationary base permanently connected to the electrical wiring of the motor car, and a signal housing removable from the base and adapted to receive a current-supply cord—kept in a handy place of storage—from the base to serve on top of the car or some distance behind the same.

An important object is to provide a caution light which operates from the electric circuit of the motor car, and dispenses with the need of a separate, battery-operated lantern usually employed as a road signal.

A better understanding of the invention may be gained by reference to the accompanying drawing, in which:

FIG. 1 is a perspective view of the rear portion of a motor car top, showing the caution light installed inside the rear window;

FIG. 2 is an enlarged section on the line 2—2 of FIG. 1;

FIG. 3 is a front view of the lower portion of the device as seen from the right-hand side of FIG. 2 and partly broken away;

FIG. 4 is a perspective view of a pair of switches seen in the lower part of FIG. 2;

FIG. 5 is a frontal perspective view of a base, partly broken away, forming the bottom of the device;

FIG. 6 is a view of the upper part of the device removed from the position of FIG. 1 and mounted on a stand, and receiving a current supply cord shown in FIG. 5; and FIG. 7 is a perspective view of a fitting at the upper part of the stand.

Referring specifically to the drawing, 10 denotes the top of a motor car, and 11 the rear window thereof. The novel caution light is in the form of a box usually mounted on the deck 12 inside the rear window. The upper part of the box is a lamp housing 15 presenting an amber lens 15a in front and a laminated lens 16 in the rear, formed as a deep red diamond in the center against an amber background 16a. A suitable switch handy to the driver and operating through a flasher—these parts not shown—may be actuated when a lamp 18 inside the housing is to operate as a caution light through the amber lens 15a for drivers approaching from the front, and through the red laminate diamond lens 16 with the amber background for drivers following from the rear.

The lower part of the present device is in the form of a fixed base 20; and the lamp housing 15 is movable in forward direction to be assembled with the base. The latter has a front wall 20a and a rear upward flange 20b, as shown in FIG. 5. The base receives a positive conductor 22 and a ground conductor 23 from the electrical circuit of the motor car, such conductors connecting with binding posts 22a and 23a of the base as shown in the right-hand bottom portion of FIG. 3. The base 20 may be made of plastic material which also serves as an electric insulator. However, when the base is of metal, it receives an insulation liner 20c and grommet 20e, while the bottom of the housing receives an insulation liner 20d as shown in FIG. 2, in order to isolate the positive conductor 22 from the base.

The binding posts 22a and 23a secure a pair of switch plates 25 on the base. The front ends of the switch plates rise with posts 25a ending with tubular sockets 25b, while the rear ends of the switch plates rise with rounded spring cams 25c. FIGS. 2 and 3 show that the housing bottom 15c has an insulation liner 20d underneath and carries a pair of pendent brackets 30 on the under side, secured by binding posts 20a; and FIG. 3 indicates by means of dotted lines that conductors 31a lead from the positive binding posts 30a to the base of the lamp 18 where contact is made to the bottom terminal of the lamp 18, while the conductor 31b leads from the negative binding post 30a to ground binding posts 18b which also fasten the lamp base 18a to the housing bottom 15c.

The brackets 30 carry tubular heads 30b at the bottom. Thus, when the housing has been assembled with the base as seen in FIG. 2, the bracket heads 30b make impinging contact with the spring cams 25c. Therefore, the electrical connection is complete between the circuit conductors 22–23 and the lamp 18, so that the same will light or flash when the driver's switch is moved to the "ON" position.

The housing and base operate as a unit when assembled to emit the diamond flashing red light against an amber background as a caution from the motor car toward the rear, so that approaching drivers will be warned that the motor car is about to slow down or stop. This warning is ample both during the day and at night. However, where the motor car must stop for an emergency or repair, such as changing or inflating a tire, the added hazard dictates the use of the caution light at a point outside the motor car, that is, on top of the same or some distance behind. For this purpose the housing is removed from the base, exposing the frontal sockets 25b of the base switch plates 25. A current take-off from these is obtainable by inserting plugs 35a at one end of a pair of conductors 35b into the sockets 25b as seen in FIG. 5. The conductors 35b form part of a cord 35 kept in the trunk of the motor car, or any other safe place, for accessory use when the caution light is to be used outside the car. When it is to be used at the rear of the car, a stand 40—also kept in the trunk of the motor car—is provided for the support of the caution light housing 15, the bottom of the same having a keeper 15b on the under side (see center of FIG. 3) into which an angle lug 40a at the top of the stand may be fitted as indicated by dotted lines in FIG. 2 for supporting the housing. Since the latter carries the pendent switch brackets 30 in exposed position, the other ends of the cord conductors 35b, fitted with plugs 35c, may be connected with the tubular bracket heads 30b as indicated in FIG. 4 to extend the circuit of the base to the stand-supported housing.

While the housing 15 and base 20 are in compact and stable form when assembled, their design is such that the housing may be withdrawn from the base, without the need of tools or special effort, to be entirely separate therefrom. Thus, FIG. 2 shows that the lower part of the housing is open in front, and that the floor 15c of the housing continues in downward direction to form a back wall 15d and side walls 15e. The back wall has a forward flange 15f, while the side walls have inward flanges 15g.

FIG. 5 shows that a pair of plates 45 are mounted on the base 20 at the ends, and secured by rivets 45a; and the outer portions of the plates are raised from the base to form narrow recesses 45b. When the housing 15 is to be returned to the base, it is moved in forward direction to insert the flanges 15g into the base recesses 45b with a snug sliding fit, so that the housing and base will become compactly assembled as seen in FIG. 2. Since the base is stationary, the assembly will remain rigid without the need of screws or other separate means to keep it together; and the device will serve as a caution light from within the motor car until such time as its use outside requires the separation and placement of the housing as previously described. When the caution light is to be operated, its placement will depend on the amount of light or visibility on the road; and the best safety factor in case of a torrential rain or a snow storm—when the margin of the road may become indefinable—is to park the car as far off the road as possible and mount the caution light on the stand beside the road. It is therefore usable within the car, on top of it, or some distance behind it, according to the extent of warning required. Therefore, the caution light is variously usable for safety against highway accidents; and it is quite simple in construction and easily handled by the average person.

I claim:

1. A caution light for motor cars comprising a stationary base installed inside the rear window of the motor car, terminals carried by the base and receiving feed conductors from the wiring system of the motor car, a lamp housing attachable to the base, and switch components carried by the base and the lamp housing and connecting to light the lamp when the lamp housing is attached to the base.

2. The structure of claim 1, the lamp housing being placeable outside the motor car, sockets carried by said switch components, and a conductor cord led from the base to the lamp housing, such cord having terminal plugs insertible in the sockets of the base and lamp housing respectively.

3. The structure of claim 1, the lamp housing having a frontal lens of amber color as a forwardly-directed signal.

4. The structure of claim 1, the lamp housing having a rear lens combination emitting a red rearward signal against an amber background.

5. The structure of claim 1, the lamp housing having a rear lens combination emitting a diamond-shaped rearward center signal against an amber background.

6. The structure of claim 1, the base switch components formed with rounded spring cams, and the lamp housing switch components formed with heads impinging the cams into tension to connect the components as stated.

7. The structure of claim 1, the lamp housing being placeable outside the motor car, the base switch components having sockets at one end and rounded spring cams at the other, the lamp housing switch components having heads formed as sockets impinging the cams into tension for connecting the components as stated, and a conductor cord led from the base to the lamp housing, such cord having terminal plugs insertible in the sockets of the base and lamp housing respecevtively.

8. The structure of claim 1, the lamp housing being movable by a sliding fit to a position over the base.

9. The structure of claim 1, the base having recesses in the sides, and the lamp housing having inward bottom flanges, the latter making a sliding fit in the recesses when the lamp housing is assembled with the base to a position over the same.

10. The structure of claim 1, the lamp housing having a bottom continued with a downward wall at the rear and a forward flange from the bottom of said wall, the base having a front wall and recesses in the sides, and the lamp housing having inward bottom flanges at the sides, such bottom flanges making a sliding fit in the recesses when the lamp housing is assembled with the base to a position over the same and meeting said front wall.

References Cited

UNITED STATES PATENTS

| | | | |
|---|---|---|---|
| 2,740,105 | 3/1956 | Dorfman et al. | 340—97 X |
| 2,878,462 | 3/1959 | Tralli. | |
| 3,274,548 | 9/1966 | Brimsek | 340—84 |

JOHN W. CALDWELL, *Primary Examiner.*

MICHAEL SLOBASKY, *Assistant Examiner.*

U.S. Cl. X.R.

340—321, 87; 240—8.18